F. H. PIERPONT.
AUTOMATIC DRILLING MACHINE.
APPLICATION FILED MAR. 16, 1906.
962,464.
Patented June 28, 1910.
8 SHEETS—SHEET 1.
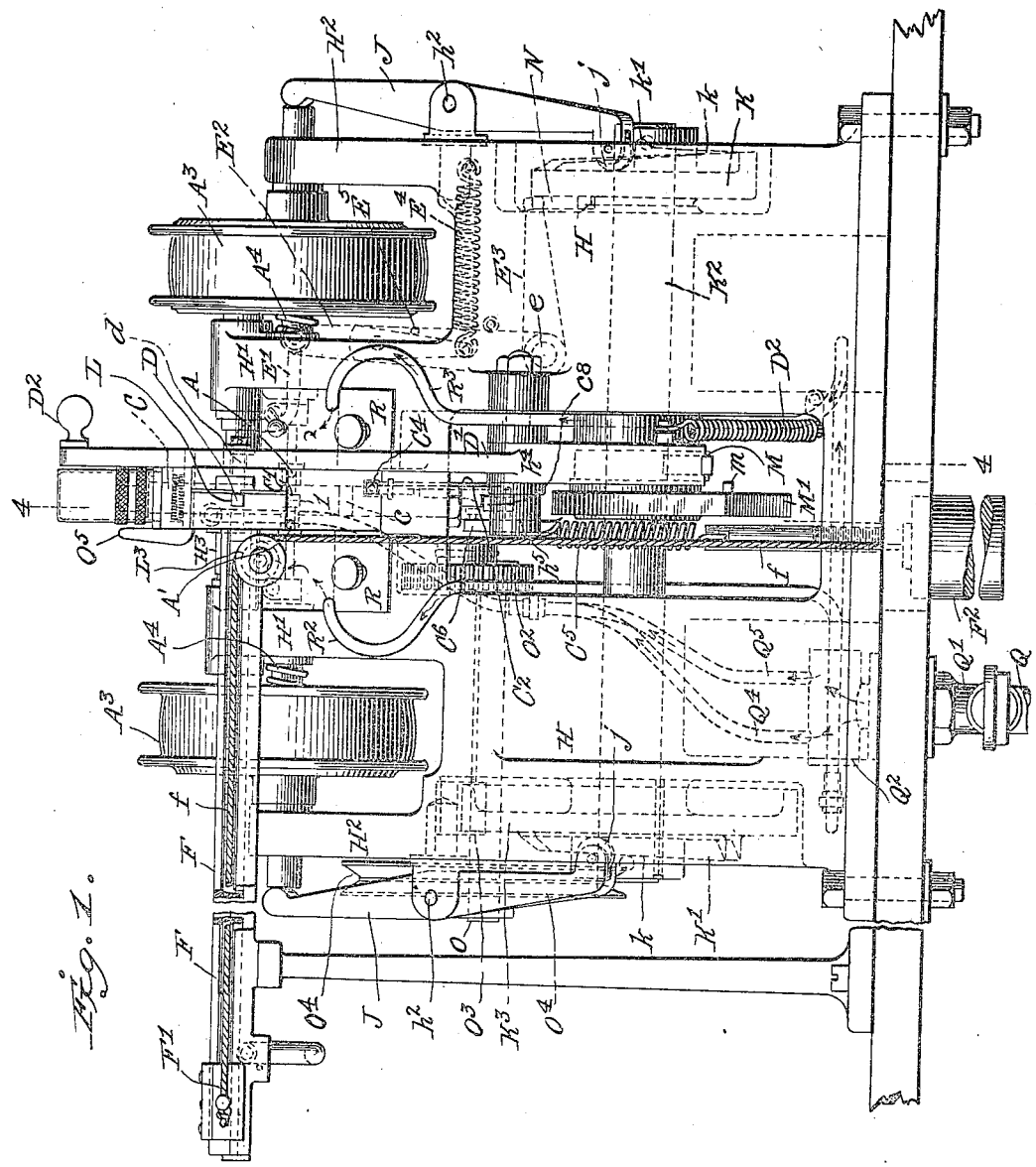
Witnesses
Edwin L. Jewell
Thomas Durant
Inventor
Frank Hinman Pierpont
By Church & Church
his Attorneys

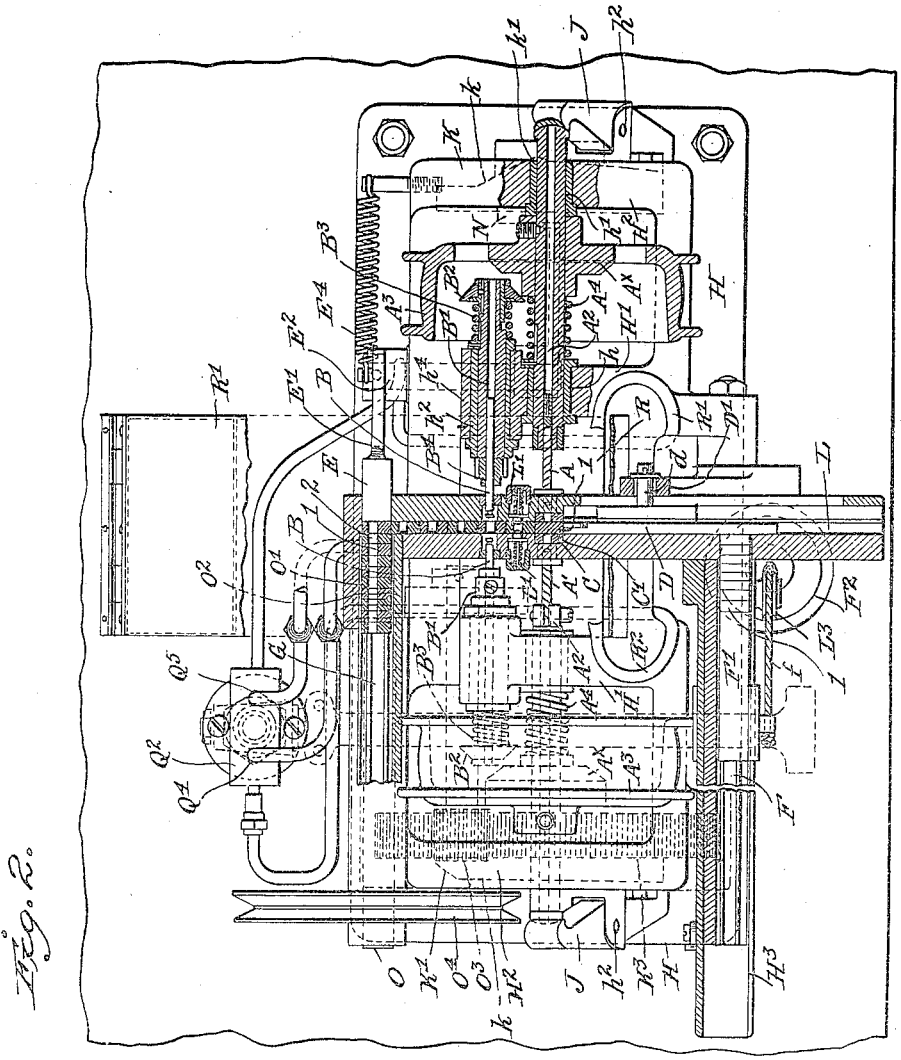

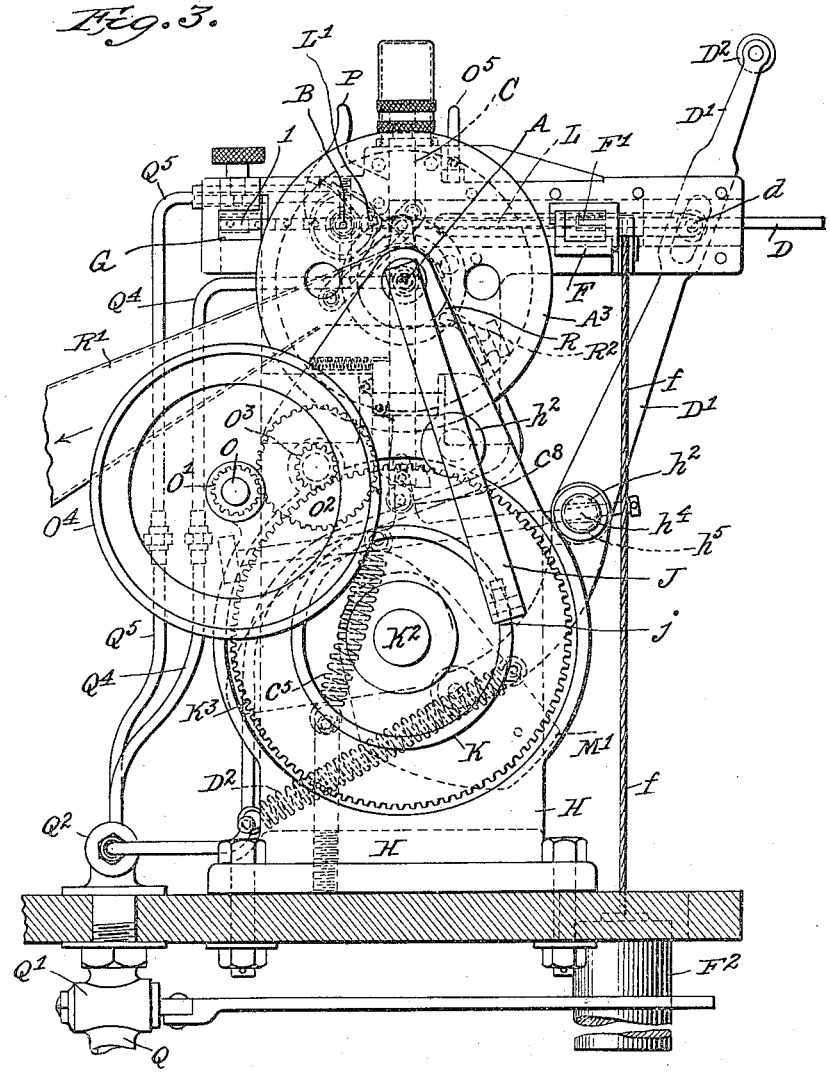

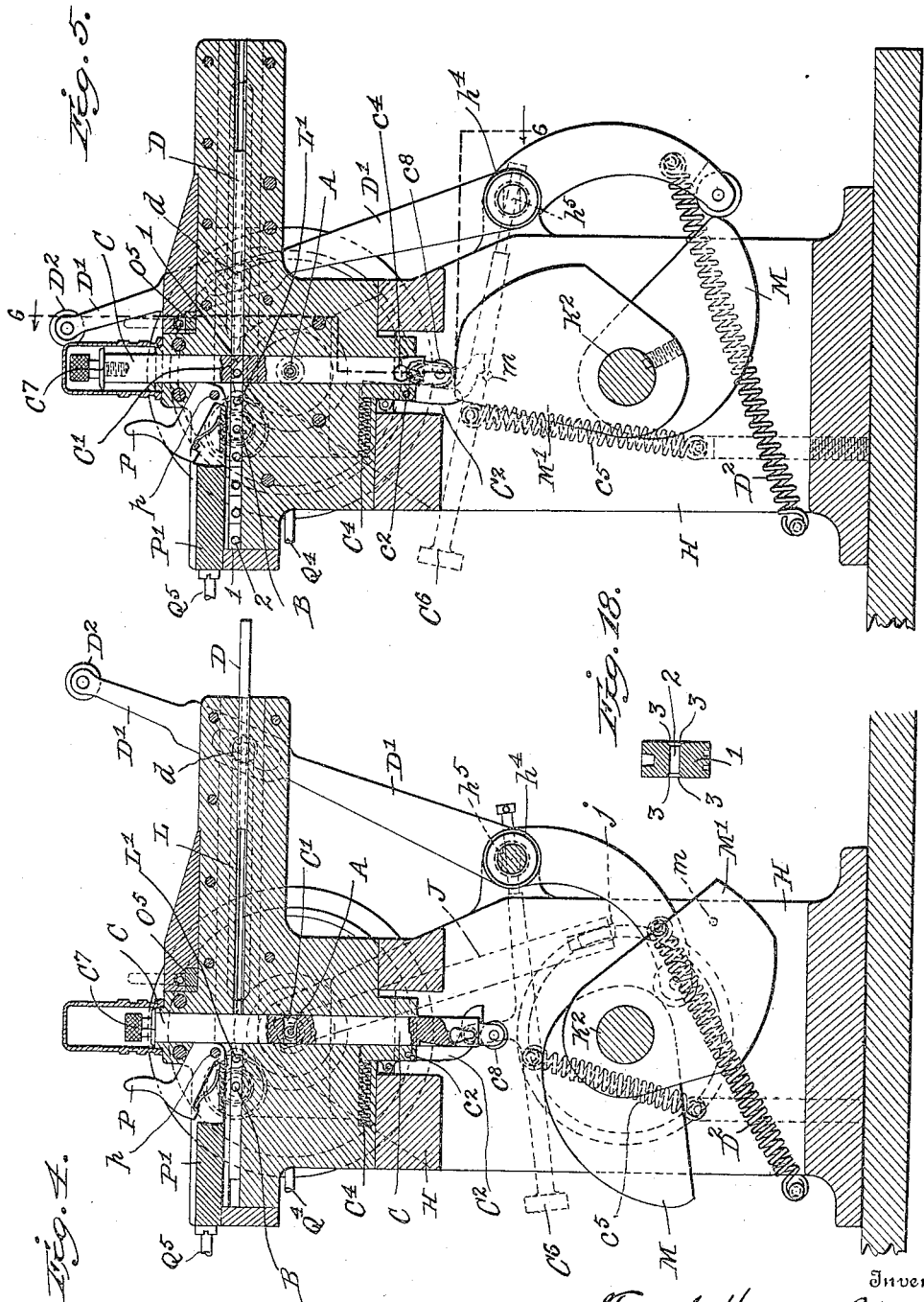

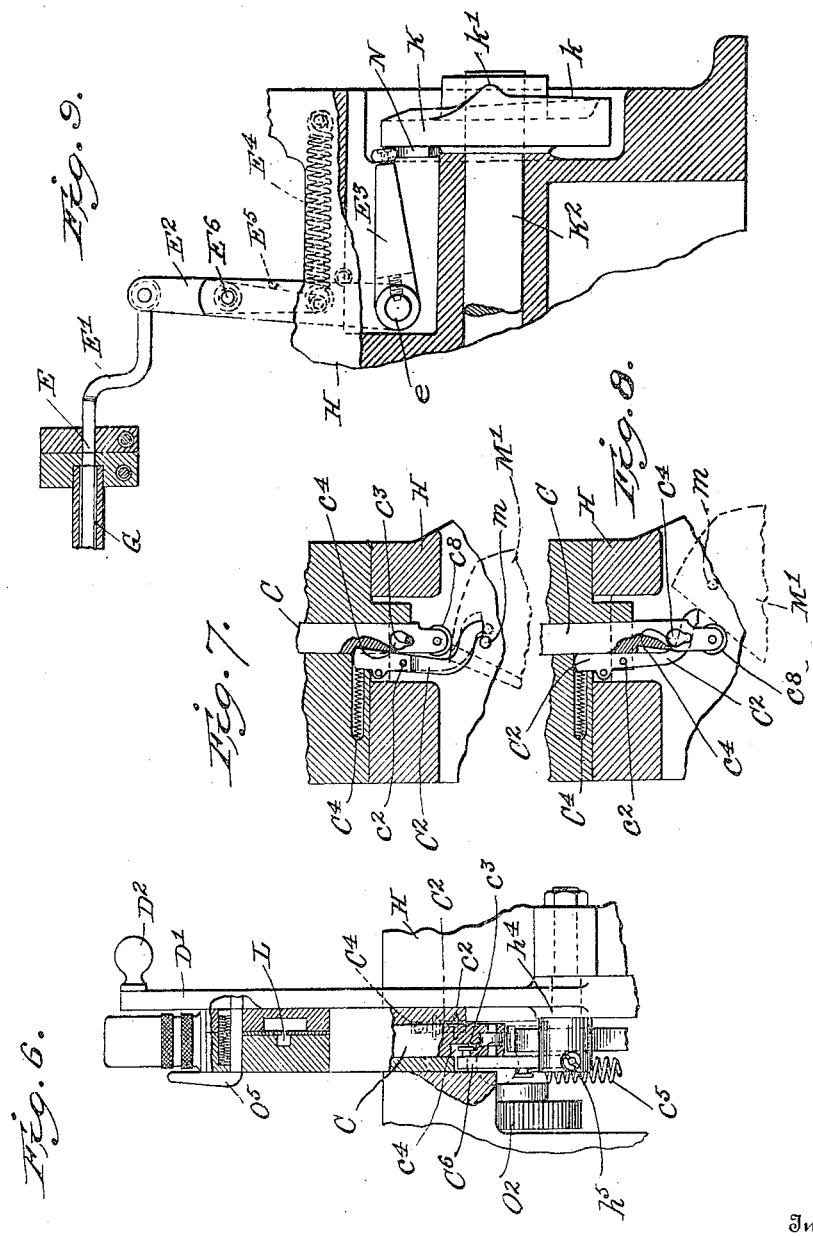

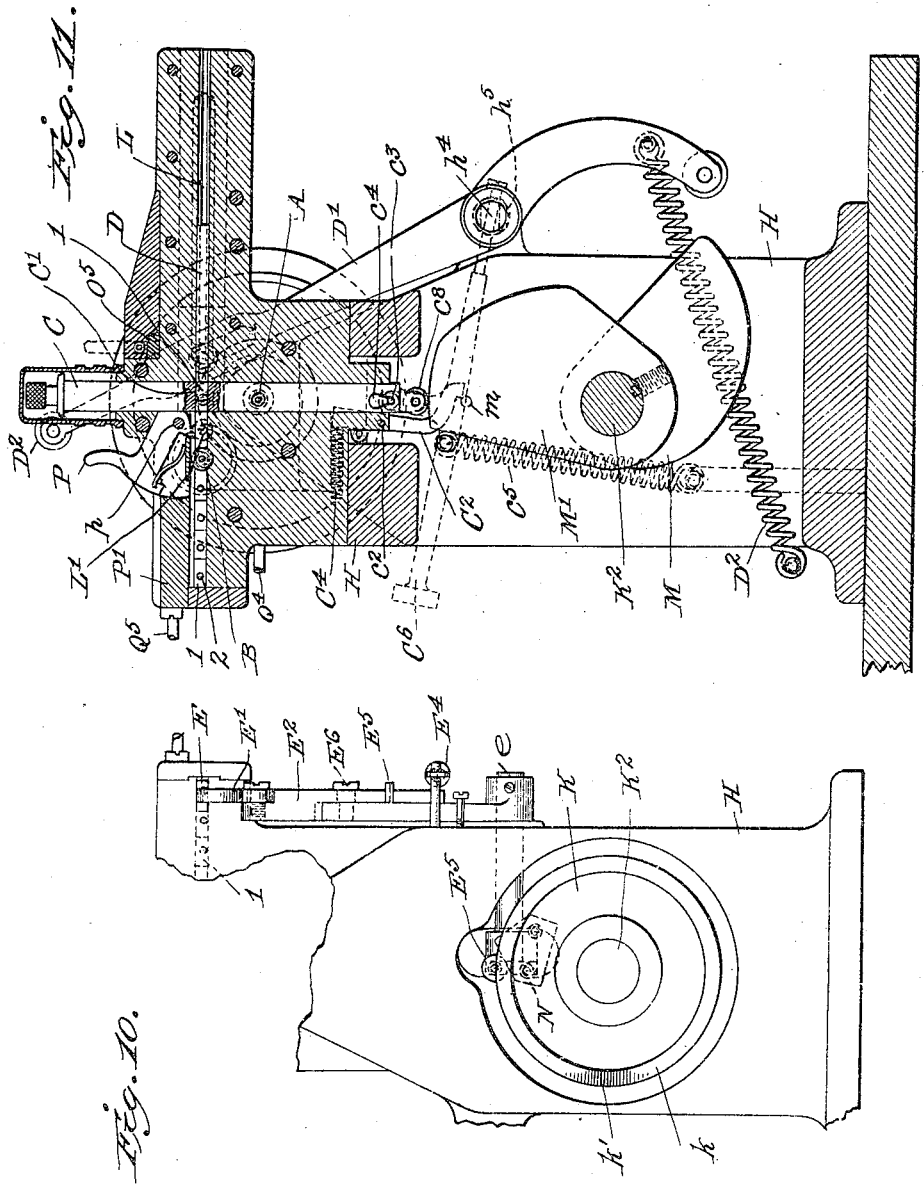

F. H. PIERPONT.
AUTOMATIC DRILLING MACHINE.
APPLICATION FILED MAR. 16, 1906.
962,464.
Patented June 28, 1910.
8 SHEETS—SHEET 7.
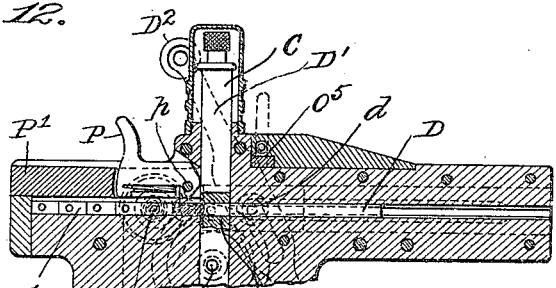
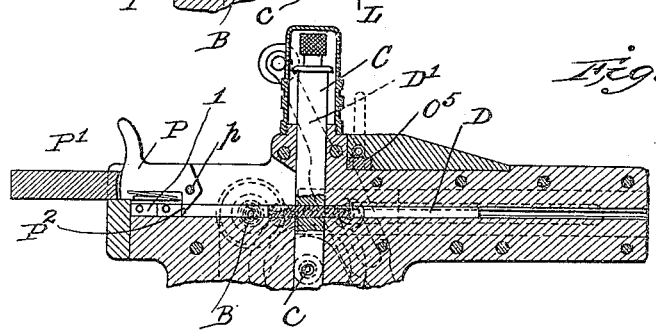
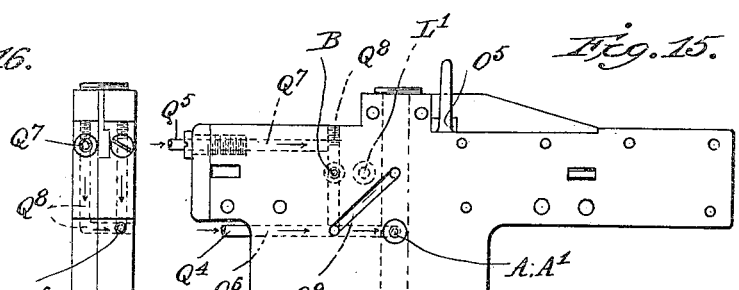
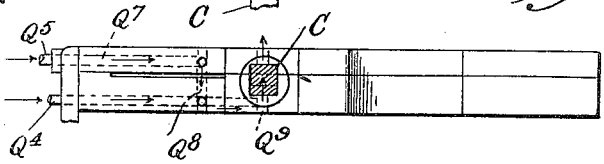
Witnesses
Edwin L. Yewell
Thomas Durant
Inventor
Frank Hinman Pierpont
By Church & Church
his Attorneys

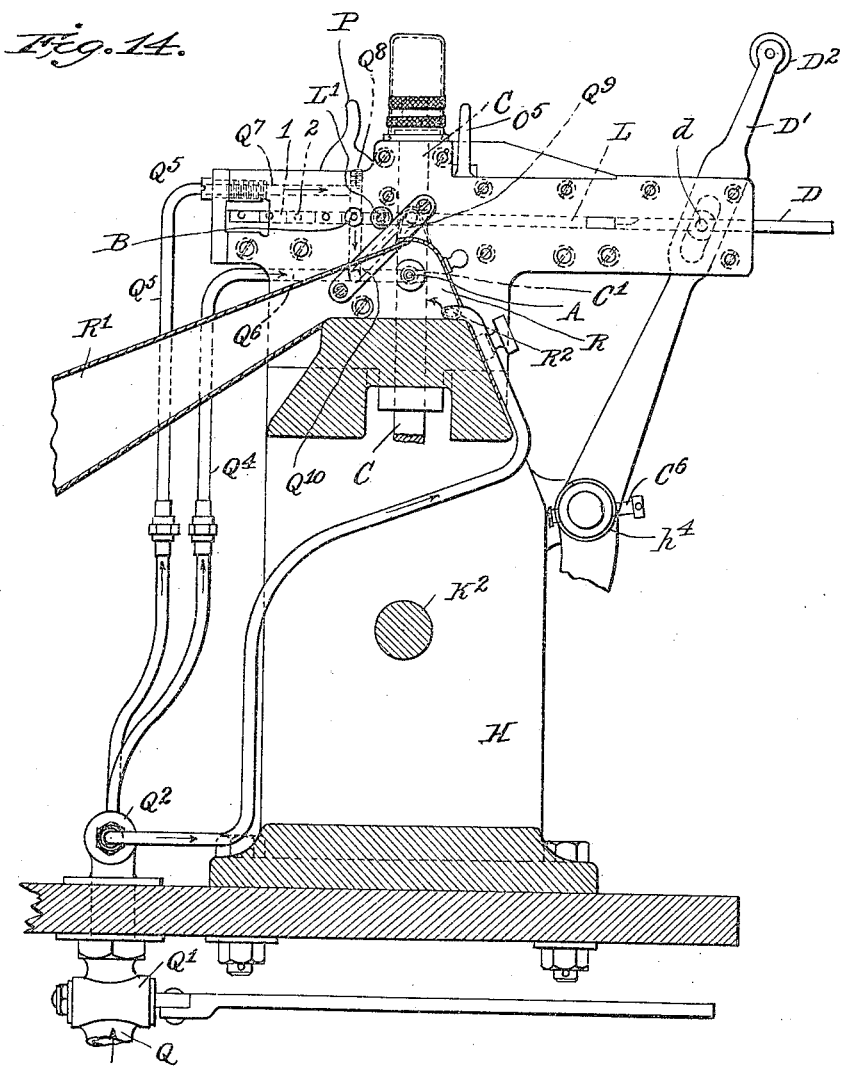

UNITED STATES PATENT OFFICE.

FRANK HINMAN PIERPONT, OF HORLEY, ENGLAND, ASSIGNOR TO LANSTON MONOTYPE MACHINE COMPANY, OF PHILADELPHIA, PENNSYLVANIA, A CORPORATION OF VIRGINIA.

AUTOMATIC DRILLING-MACHINE.

962,464.  Specification of Letters Patent.  Patented June 28, 1910.

Application filed March 16, 1906. Serial No. 306,406.

*To all whom it may concern:*

Be it known that I, FRANK HINMAN PIERPONT, a citizen of the United States, temporarily residing at Horley, Surrey, England, have invented certain new and useful Improvements in Automatic Drilling-Machines; and I do hereby declare the following to be a full, clear, and exact description of the same, reference being had to the accompanying drawings, forming a part of this specification, and to the figures and letters of reference marked thereon.

This invention relates to drilling, gaging and burring machines, and it is chiefly intended for so treating matrices for type casting machines, and particularly those of the well known monotype machines in which connection it will be described.

The matrices employed in the monotype casting machines comprise short blocks, rectangular in cross section, and having the representation or molds of the various type or other signs sunk in one of their ends. These matrices are all mounted in a suitable die-case or carrier to which motion is imparted to bring the required matrix over a mold for the body of the type or character. In addition to this movement, the matrices are so mounted in their carrier that each can be moved independently of the other and thus allow the required matrix to be speedily and accurately centered over the mold cavity by a cone-pin which enters a corresponding recess in the opposite end of each matrix to that having the mold of the character. For the purpose of permitting this individual adjustment of the matrices, they are mounted in rows upon rods or bars which extend across the matrix carrier and these rods pass through transverse openings in the matrices. The diameter of the openings is slightly larger than that of the rods, permitting just sufficient movement for the centering and adjustment above referred to.

The machine forming the subject of this invention is chiefly designed for the drilling of the aforesaid transverse openings in the matrices through which the rods pass, and from the foregoing description it will be appreciated that these holes must be formed with extreme precision and accuracy, and that a matrix when being drilled must be located with extreme exactness; further, the edges of the holes must be smooth, since any bur or fin will interfere with the mounting and individual adjustment of the matrices in the die-case. Owing to the accuracy with which it is required to operate it is desirable that the matrices should all be of exactly the same size, and that any material variation of size between the matrices should be detected or avoided. In addition, since the cost of production of these matrices is a serious item it is desirable that the machine be self acting or automatic, and that it perform the various operations speedily as well as accurately. These features and points are all recognized and provided for by the present invention, according to which the matrices are automatically fed, preferably one by one, from a galley into a channel wherein moves a reciprocating plunger. This plunger delivers the matrices one at a time into a gaging and holding carrier or slide, that is to say, a carrier which moves in a guide or bearing in which it is a close fit and receives and transfers the matrix to the drilling position, the feeding plunger terminating its feed movement at a predetermined point relative to the slide. The block or matrix so held is then operated upon by two drills acting simultaneously or successively from its opposite sides and after being drilled the carrier is brought back to first position and the matrix is ejected therefrom by the next matrix advanced by the feed plunger. The drilled matrix is then passed to or toward the burring tools by the succeeding matrix or matrices.

The matrix receiving cavity in the slide or carrier is only sufficient to receive the matrix so that the latter is accurately presented to the drills, and while being drilled is securely held against displacement in any direction.

The drills are situated at a different level from or in a plane to one side of the matrix channel from which the carrier receives the matrices. The matrix channel, in the machine illustrated, is horizontal and above the axes of the drills and the matrix slide or carrier moves vertically, first to present the matrix to the drills and then to, return it to the matrix channel, whence it is passed on to the burring tools. By the gaging mechanism thus provided, should a matrix of wrong length happen to get into the machine, it is prevented from being drilled, since the slide or carrier being a close fit in its guide and the matrix feeding pusher terminating its feed movement at a constant distance from the slide or carrier, a short or a long block succeeding one of normal length, will project or cause a companion to project from the carrier and interlock it with the guide. These abnormal articles will thus automatically lock the matrix carrier and prevent it from shifting to the drilling position, and will, therefore, pass through the machine and be ejected, undrilled, at the delivery side thereof where they can readily be detected.

The machine is so contrived that the failure of the slide or carrier to descend does not, as will hereafter be fully described, interfere with the operation of the machine, nor cause injury to any of the parts.

After a matrix has been ejected from its carrier by the entry therein of another matrix, it is pushed along the matrix channel into position between two opposed burring tools which smooth down the edges of the opening formed by the drills. The matrix is then passed to the end of the matrix channel, and finally discharged by a horizontally reciprocating plunger, into a receiving galley.

The drills are preferably positively driven, and the burring tools are driven from and advanced with the drills the movement of their spindles being limited, so that the tools only remove a definite portion of the edge of the hole.

Referring now to the accompanying drawings wherein is shown a preferred form of embodiment of the invention as adapted to treat matrices for the "monotype machines," Figure 1 is a front elevation of the machine. Fig. 2 is a sectional plan taken in the plane of the burring tools. Fig. 3 is an end view looking from the left hand side of Fig. 1. Fig. 4 is a transverse sectional elevation on the line 4—4 of Fig. 1 and showing the feed plunger in position to admit a matrix to the matrix channel. Fig. 5 is a similar view to Fig. 4, the feed plunger being at the opposite end of its normal stroke, having just inserted a matrix into the matrix carrier or vertical slide. Fig. 6 is a sectional elevation on the line 6—6 of Fig. 5 showing the carrier actuating mechanism. Figs. 7 and 8 are sectional detail views of part of the carrier actuating mechanism. Fig. 9 is a sectional elevation showing a delivery plunger which passes the matrices from the matrix channel into the receiving galley after they have been drilled and burred. Fig. 10 is a side elevation of the mechanism shown in Fig. 9. Figs. 11, 12 and 13 are transverse sectional elevations showing the operation of the feed plunger for clearing the machine of matrices at the end of the work. Fig. 14 is a transverse sectional elevation of the machine showing a preferred arrangement of compressed air conduit by which the machine is kept clear of chips or other foreign matter. Figs. 15, 16 and 17, show details of the compressed air conduits, and Fig. 18 is a sectional elevation on an enlarged scale of one of the matrices treated by the machine.

The same characters designate corresponding parts in the several figures.

A A′ are the drills; B, the burring tools; C, the gaging carrier; D the feed plunger; E, the delivery plunger; F the feed galley; and G the receiving or delivery galley.

According to the present embodiment of the invention the drills A A′ are mounted in spindles $A^2$ which are carried in bearings $h\ h'$ in uprights H′ $H^2$ of the machine frame H. These spindles are each rotated by a belt pulley $A^3$ and are free to slide longitudinally in their bearings.

Bearing on the outer ends of the drill spindles are arms J pivoted to the machine frame at $h^2$ and carrying at their other ends rollers $j$ against which rotating cams K K′ bear, the cam K engaging the lever J which acts on the spindle of the drill A and cam K′ engaging the lever J for the spindle of the drill A′ by which means the drills are fed forward at the proper time. Both cams K and K′ are provided with parts $k$, Fig. 9, by which the drills A A′ are fed forward so that each drill cuts preferably through half the thickness of the matrix. A single drill might be used for the purpose, but as this would entail the formation of a large bur or fin at one side of the matrix and a contraction of presure on one side, it is preferred to employ two drills whereby these objections are avoided and the hole more speedily cut. But, if each drill were to be withdrawn after it has penetrated approximately halfway through the matrix, a fin or shoulder would be left in the opening where the two cuts met, this is obviated by causing one drill, for example, A′, to be withdrawn after cutting approximately half-way through the matrix, and causing the drill A to follow on until it has passed clear through the matrix, by which means a straight and even opening is cut clean and accurately through the matrix. In order that this operation may be performed the cam K from which the drill A is operated has, in addition to the part $k$ similar to the cam K′, an additional raised part $k'$, (see Figs. 9 and 10) to push the drill clear through the matrix after or during the withdrawal of the drill A′ and this latter portion of the tool's travel can be performed more rapidly than the cutting part. The drills are each withdrawn, after their respective cut or travel is completed, by a spring $A^4$ interposed between the pulley $A^3$ and the bearing $h$.

While being drilled the matrix is supported and held accurately in position by the gaging carrier C. The gaging matrix carrier C is here represented in the form of a vertically reciprocating slide accurately fitted between parallel guiding surfaces on the frame and provided with a transverse opening or chamber C' of such form and dimensions that a matrix of proper proportions will exactly fill it. This matrix receiving cavity or chamber C' is preferably formed wholly within the body of the slide (rather than in one side thereof) its length and cross-section corresponding with those of the matrix, so that when the latter is presented in drilling position it will be inclosed and held on all sides by hardened steel walls, except at the points where the drills engage where the sides of the slide are perforated, forming gages to receive and accurately position said drills as they are advanced to cut the matrix.

After the opening 2 (see Fig. 18) is drilled in a matrix 1, the carrier C is shifted to bring its chamber C' into alinement with the matrix channel L and the matrix is ejected from the carrier by the advance of the next undrilled matrix which is now fed forward by the feed plunger D.

On being ejected from the carrier C the drilled matrix is caught between two spring-controlled stop-pins L', which project slightly into the matrix channel L and enter the opening 2 in the matrix as shown in Fig. 2. These pins represent blank detaining means operating to retard the delivery of the blank from the carrier and insure its position, as when a short blank is delivered to the carrier and the displaced blank is relied upon to arrest the carrier, said pins also operating to prevent a matrix being pushed too far along the channel L and into the path of the burring tools B, which latter, when advanced, would not enter fairly, if at all, into the opening 2 of the matrix. On another matrix being ejected from the carrier C it pushes the matrix engaged by the pins L' from between these pins into position between the burring tools B. These tools are each mounted upon a rotating and longitudinally movable spindle B' carried in bearings $h^2$ and each provided at its outer end with a conical friction surface $B^2$ arranged to receive motion from corresponding friction cones $A^x$ on the drill spindles $A^2$. These cones $A^x$ in addition to rotating the spindles B' press them forward when the drills are fed forward, so that when a matrix is presented in front of the burring tools the latter are simultaneously advanced, and rotated, to smooth down the edges of the openings 2, as at 3, Fig. 18. Since the drill A is fed forward through a greater distance than the drill A' provision has to be made to prevent the burring tool B which is rotated from the spindle of the drill A from being fed forward too far. This is accomplished by setting back the cone $A^x$ on the spindle of the drill A so that the latter advances a greater distance than the cone on the spindle of the drill A' before this cone $A^x$ engages its particular cone $B^2$, thus causing both burring tools to advance through equal distances. The burring tools B are returned after each operation by springs $B^3$ disposed between the bearings $h^2$ and the cones $B^2$. The ends $B^4$ of the spindles of the burring tools are adapted to come against the walls of the matrix channel and act as stops or gages to prevent the tools being fed forward too far. Any further advancement of the drilling spindles carries forward the friction cones on the burring tool spindles which are free to slide against the action of the springs $B^3$, interposed between the spindles proper and the tubular sections carrying the cones $B^2$ said tubular sections being splined to the spindle so as to permit longitudinal play.

The matrices 1 to be dealt with are placed side by side in the feed galley F at the front of the machine. This galley is detachably secured to an arm $H^3$ of the machine so that it can readily be removed for refilling. A follower F' is provided and is connected by a cord $f$ to a weight $F^2$ passing over a pulley $L^3$ so that the follower is constantly tending to feed the matrices into the matrix channel L with which the end of the feed galley communicates and in which operates the feed plunger D.

When the feed plunger D is in the position shown in Figs. 1, 3 and 4, its end is withdrawn beyond the end of the column of matrices in the feed galley and the first matrix is caused, by the follower F' acting under the influence of the feed weight $F^2$, to enter the channel L which is only of sufficient width to accommodate one matrix and to prevent any side play thereof. The plunger D now advances and moves the matrix in the channel L endwise along the channel and into the matrix receiving opening C', see Fig. 5, in the vertical slide or carrier C. At the same time the feed plunger closes the entrance from the feed galley into the matrix channel and prevents other matrices entering.

The motions of the vertical slide or carrier C are so timed that the matrix receiving cavity C' therein is in line with the matrix channel L when a matrix is fed forward by the plunger D, after which the carrier C descends or is caused to descend carrying a matrix with it to the drills A A', that is if the matrix which has been fed into the cavity C' of the slide is exactly of the proper dimensions. If, however, the matrix thrust into the chamber C' is slightly too long, even say $\frac{1}{1000}$th part of an inch, then its forward end will project beyond one side of the carrier C into the second part or delivery end of the matrix channel L and thus prevent the descent of the vertical slide C. This matrix is therefore passed through the machine undrilled, since the failure of the carrier to descend does not interfere with the other movements of the machine; and on another matrix being fed forward, the defective and undrilled matrix is ejected from the carrier and ultimately delivered to the receiving galley G at the back of the machine, where its presence can be detected at a glance when a filled galley is removed from the machine. On the other hand, if a matrix which is say the $\frac{1}{1000}$th part of an inch short is fed into the chamber C' then it will not completely eject the previously drilled and normal matrix and the carrier being thus arrested in its upper position, this faulty matrix, like the other or too long one, is also passed through the machine into the receiving galley, undrilled.

Should too short a block enter the machine first it will not prevent the carrier from descending as above described, since there will be no block in front of it to engage the carrier; care should therefore be taken to insure a normal article being inserted first when the machine is started and for this purpose a blank of known and proper size may be employed.

The feed plunger D is conveniently operated from a cam M on a shaft $K^2$ which also carries the cams K K'. This cam which is shown clearly on Figs. 4, 5 and 11, is adapted to bear, at the proper time, against one end of an arm D' pivoted at $h^4$ to the machine frame. The upper end of the arm D' is slotted to receive a pin $d$ on the plunger D and under the action of the cam M this lever in rocking operates the plunger. The cam is cut to allow for a quick return of the lever D' which is effected by a spring $D^2$ connected to the lever and to the machine frame. The shaft $K^2$ also carries a cam M' which operates the vertical slide or carrier C.

The reciprocating motion of carrier C for alternately presenting its matrix receiving cavity C' opposite matrix channel L and drills A A', is produced by a cam M' engaging a roller $c^8$ on the carrier and acting in conjunction with a retracting spring $C^5$. For convenience the spring $C^5$ instead of being directly connected to the carrier is coupled to a lever $C^6$ pivoted at $h^5$ and provided with a headed pin $c^3$ adapted to be entered in a keyhole slot or seat $c^4$ in the carrier.

The outer surface of cam M' may be concentric with the axis of rotation and serve as the gage for positioning the carrier with its matrix cavity in alinement with the matrix channel, for inserting and discharging matrices; but in such case wear on the cam surface and roller would tend to disturb the proper relation of the parts and interfere with the introduction of the matrices. To avoid this the carrier is equipped with a positioning gage in the form of a trigger or latch $C^2$ pivoted at $c^2$ in position to engage a shoulder on the carrier when the latter has reached the extreme of its motion, a spring $C^4$ serving to effect and maintain the engagement of said latch.

The latch is automatically withdrawn at the end of the matrix inserting period by means of a pin $m$ on cam M' arranged to engage the lower or lever end of the latch, and so located with respect thereto and to cam M' that as the heel of the cam approaches roller c' the latch will be withdrawn, allowing said roller to run down the steep portion of the cam and thus retracting the carrier with a smooth and rapid motion.

The descent or retrograde motion of the carrier is interrupted by a second gaging device for accurately positioning the matrix cavity C' opposite the drills. In the present instance this gaging function is performed by a collar or shoulder $C^7$ on the carrier and engaging a seat on the frame. By adjusting the position of the collar in the direction of motion of the carrier, the latter can be stopped with its matrix cavity in proper relation to the drills.

By the employment of the two positioning gages for the matrix carrier not only can the feeding and drilling positions of the carrier be accurately and independently determined, but the necessity for extreme accuracy in the form of cam M' is avoided, the latter serving merely as a means for translating the carrier from one position to the other, hence it is only important that the cam should be of such form as to insure the advance of the carrier to or beyond the engaging point of the latch, and, in the latter case, permit a retrograde movement until the latch takes its bearing.

When a matrix is pushed along to the end of the matrix channel by the succeeding matrices it is passed into the receiving galley G by the delivery plunger or pusher E which packs the completed matrices in this galley side by side. The plunger E is operated from a cam N on the shaft $K^2$ (see Figs. 1, 9 and 10) and conveniently formed in one with the cam K. On one end of the plunger E is a rod E' to which a bell-crank lever $E^2$ $E^3$ is connected. This bell crank lever is pivoted at $e$ and its free lower end is arranged to be acted upon by the cam N. The plunger E is withdrawn and the lower free end of the bell-crank lever $E^2$ $E^3$ is kept in contact with the cam N by means of a spring $E^4$. The upper arm $E^2$ of the bell crank lever $E^2$ $E^3$ is in two parts hinged together by a pin $E^6$. The spring $E^4$ is connected to the upper section of arm $E^2$ below its pivot $E^6$ and operates to maintain elastic contact with pin $E^5$, thus tending to keep these two portions of the lever in the same relative position to each other. If, however, the plunger E is for any reason prevented from advancing the lower section of the bell crank lever goes through its cycle of movements without imparting any motion to the upper extremity $E^2$ of the lever.

The cam shaft $K^2$ is rotated at the proper speed from a driving shaft O through a train of gears O' $O^2$ $O^3$ and $K^3$ the first and last of which are on the shafts O and $K^2$ respectively. The shaft O carries a V-pulley $O^4$ by which it is driven.

The machine, as constructed and described herein performs the following cycle of operations, and it is to be understood that this cycle may be varied without departing from the invention.

Assuming the parts to be in the position shown in Figs. 1, 2 and 3, the feed galley F is filled with undrilled matrices of which it is preferably adapted to hold about sixty placed side by side. With the feed plunger D in its withdrawn position as shown the passage between the feed galley F and matrix channel L is open and a matrix is forced into this channel by the feed weight $F^2$ and follower F'. On the forward stroke of the feed plunger D under the action of its cam M, into the position in which it is shown in Fig. 5, the matrix in the channel is pushed into the matrix-receiving cavity C' in the vertical carrier C, which, after receiving this matrix, is unlocked as above described and permitted to drop on to its cam M and descends carrying the matrix between the drills A A'. The rotating cams K K' now engage the levers J and move the drills forward to bore the matrix. After the drills have acted and recede the carrier C is raised by its cam and locked in its upper position by the latch $C^2$. The plunger D which has meantime been drawn back to allow another matrix to enter the channel L now advances pushing this new matrix into the cavity C' and pushing out the matrix which has been drilled and becoming itself exactly located in the cavity. The matrix thus pushed out is caught by the spring controlled stop pins L' where it rests until another matrix has been drilled and ejected from the carrier C. This last-ejected matrix pushes the one engaged by the stop pins from between these pins and in between the burring tools B. These burring tools are now advanced by the contact of their cones $B^2$ with the cones on the spindles of the drills which are now advancing to drill a matrix in the carrier C and from which the burring tools receive a rotary motion in addition to the longitudinal feed. When a matrix has been burred it is pushed clear of the burring tools by the next oncoming matrix and so on until the part of the matrix channel beyond the burring tools is filled with matrices; in the example shown, there are four burred matrices in the channel. When this happens the delivery pusher is advanced by its cam and pushes the end matrix into the receiving galley G and so on until the galley is full.

The presence of an undrilled matrix in the receiving galley can readily be detected since the matrices being placed side by side in the galley this undrilled matrix will block the hole which otherwise would extend through the entire column of matrices.

Should the machine be stopped after the feed plunger has inserted the last matrix into the cavity in the carrier C there will remain in the machine six matrices, two of which have yet to be burred, which will not be ejected in the normal working of the machine. In order to get these matrices out the running of the machine is continued until a stop $O^5$ against which the lever D' strikes at the end of the forward stroke is withdrawn and the lever D pulled over by the handle $D^2$ to eject the last matrix from the slide, at the same time pushing another matrix between the burring tools and forcing the matrix at the other end of the column in the matrix channel into the path of the delivery plunger E. On the return stroke of the plunger E another matrix is allowed to pass into the path of this plunger and the last matrix in the channel L is placed between the burring tools. There now remain in the matrix channel four matrices which are caused to pass successively into the path of the pusher E by a spring-controlled catch P pivoted at $p$ to a sliding bar P', see Figs. 4, 5, 11, 12 and 13. When this catch is moved down from the position shown in Fig. 11 to that shown in Figs. 12 and 13, its nose $P^2$ engages with the rear end of the last matrix in the channel L. The catch P and bar P' can now be pulled longitudinally step by step as shown in Fig. 13 to bring the remaining matrices one by one into the path of the plunger E, as this plunger pushes the matrices one at a time into the receiving galley G.

As the accuracy of operation depends to some extent on the matrices fitting closely together and being a fairly close fit in the various channels it is desirable that chips or cuttings from the matrices themselves be prevented from lodging in the channels or between the matrices. For this purpose jets of compressed air are employed to carry these chips away and are conveniently situated as shown in Figs. 14, 15, 16 and 17. A pipe Q controlled by a valve Q' is attached to a junction box $Q^2$ from which it is distributed to the required points by various conduits. The drilling tools and matrix carrier opening on each side are covered by a casing R from which a conduit R' extends on one side to convey away chips and the like and prevent these lodging between the matrices or blocking the machine. A pair of air conveying conduits $R^2$ $R^3$ extend into this inclosing casing from opposite sides, see Figs. 1, 2, 3 and 14. Another conduit $Q^4$ opens into the chamber $Q^6$ so as to deliver a current of air between the drills, while a third conduit $Q^5$ delivers air at the burring tools by means of a passage $Q^7$ which is in communication with passage $Q^6$ by a cross and downward passage $Q^8$, and also is in connection with a passage $Q^9$ on the outside of the vertical carrier box and covered by a plate $Q^{10}$ which is for the purpose of blowing a current of air through the newly drilled hole, after the carrier has risen to its normal height, into the covered space R on the opposite side of the frame.

Having thus described my invention what I claim as new and desire to secure by Letters Patent, is:—

1. In a machine such as described, the combination, to form an automatic blank gaging and transfer mechanism, of the following elements, to-wit: a blank carrier including a slide provided with a transverse blank receiving cavity or holder open at opposite ends, gaging members in proximity to the ends of the blank receiving cavity or holder between which the carrier reciprocates; a blank feeding device terminating its motion in one direction at a predetermined distance from the blank carrier; and actuating devices for the carrier and blank feeder adapted to permit the motion of the carrier to be suspended by the action of a defective blank while the feeder continues in action and effects the removal of the obstructing blank.

2. In a drilling machine such as described, the combination of the following elements, to-wit: drilling devices; a blank feeder having a predetermined movement; and a blank gaging and transferring mechanism intermediate the drilling devices and feeder and including a reciprocatory carrier movable between gaging devices and provided with a blank receiving cavity or holder.

3. In a drilling machine such as described, the combination of the following elements, to-wit: a pair of alined drills; a blank gaging and transfer mechanism including spaced gaging devices and a blank carrier, the latter provided with a blank holding cavity; a blank feeding device including a pusher terminating its motion at a predetermined distance from the carrier, and operating to insert successive blanks into the carrier, and in so doing displace the blank at the time in the carrier; and a pair of burring tools on opposite sides of the line of discharge from the carrier in position to engage successive blanks as delivered therefrom.

4. In a machine such as described, the combination with blank feeding devices, drilling apparatus and a blank carrier intermediate the feeding devices and drill for presenting the blanks and holding them in position for drilling, of means for gaging the position of said carrier relative to the axis of the drill, and means for actuating said carrier.

5. In a machine such as described, provided with drilling and burring devices in parallel relation and in combination therewith means for advancing and retracting the drill, a beveled driving wheel on the drill spindle, a reversed beveled wheel on the bur spindle, a yielding connection between said driven wheel and its spindle, and means for gaging the advance of the bur spindle.

6. In an automatic drilling machine such as described, the combination with a drilling mechanism, blank feeding mechanism, and a blank carrying mechanism intermediate the feeder and drill, of means connected with the blank carrier for automatically suspending its action upon the presentation of a blank of abnormal length so that such defective blank will be withheld from the drill and delivered in undrilled condition.

7. In an automatic drilling machine such as described, the combination with drilling mechanism, a blank feeder and an intermediate blank carrier and holder, of means controlled by blanks in the carrier for automatically suspending the action of said carrier and preventing the delivery to the drill of blanks of abnormal dimensions.

8. In a machine such as described, provided with a reciprocating carrier presenting its blank holder in alinement with a blank feeder and a drill alternately and successively, means for actuating and gaging the positions of said carrier comprising in combination with the latter means for positively moving the carrier in one direction, means tending to move the carrier in the opposite direction, a latch for holding the carrier in one position of adjustment, and a stop for arresting the carrier in the other position of adjustment when the latch is withdrawn.

9. In a machine such as described, the combination with the carrier, and its advancing cam provided with an abrupt incline or heel, of the latch for engaging the carrier to hold it in position and the trip moving in unison with the cam and acting on the latch to release the carrier and cause it to engage the abrupt incline during its return motion.

10. In a machine such as described drilling, blank feeding and blank carrying and holding devices and in combination therewith means for actuating the blank carrier and sustaining it accurately in position for the insertion and discharge of blanks, the same including an operating cam and a retaining latch, said cam being constructed to successively advance the carrier and trip the latch.

11. In a machine such as described, the combination of the following elements, to-wit: a reciprocatory blank carrier provided with yieldable retracting means and a blank receiving cavity extending transversely of its line of motion; and gaging devices located to one side of the line of motion of said carrier in position to engage blanks of abnormal dimensions when seated in said carrier.

12. In a machine such as described, the combination of the following elements, to-wit: a reciprocatory carrier provided with a blank receiving cavity open at opposite ends and extending transversely of the path of movement of said carrier; actuating devices including means for yieldably propelling the carrier in one direction; and gaging devices located intermediate the opposite extremes of the carrier's traverse and in line with the open ends of the blank cavity.

13. In a machine such as described, the combination of the following elements, to-wit: a reciprocatory blank carrier provided with a transverse blank cavity open at opposite ends and yieldable actuating means; a blank guide or channel extending transversely of and intersecting the line of travel of said blank carrier and provided with a gap or opening for the passage of the latter; gaging devices located to one side of the blank channel in proximity to the open ends of the blank cavity; and a pusher movable longitudinally of the blank channel.

14. In a drilling machine such as described, the combination with drilling appliances, of a movable blank carrier provided with a transverse seat dimensioned to receive a blank of normal proportions parallel gaging surfaces between which the carrier moves in bringing the contained blank to drilling position, and means having a normal tendency to advance said carrier to drilling position.

15. In a drilling machine such as described, the combination with a longitudinally movable drill, of a blank carrier movable transversely of the axis of the drill, to present and hold the blank in drilling position and withdraw the same therefrom, said carrier including a slide provided with a blank cavity or seat extending transversely therethrough, parallel gaging surfaces between which the carrier has its motion, and means having a normal tendency to advance said carrier to the drilling position.

16. In a machine such as described, the combination with drilling appliances and a movable blank carrier, the latter including a member provided with a transverse open ended blank receiving cavity, parallel guides between which said movable member reciprocates, and means having a normal tendency to advance said carrier to drilling position, of a delivery channel beyond one end of said parallel guides and a blank pusher operating to advance the blank from the delivery channel and seat it within the blank cavity before the latter enters between the parallel guides.

17. In a machine such as described, the combination of the following elements, to-wit: a longitudinally reciprocating drill; a blank carrier movable transversely of the axis of the drill and provided with a blank receiving cavity extending through the carrier and having the side wall perforated for the passage of the drill; opposing guides between which the carrier reciprocates to close the ends of the blank cavity; means having a normal tendency to advance said carrier to drilling position; a feed channel to one side of the drill and intersecting the path of the carrier; and a pusher working in said channel.

18. In a machine such as described, an automatic blank gaging and transfer mechanism including the following elements, in combination, to-wit: a carrier provided with a blank receiving holder or cavity proportioned to receive a blank of predetermined dimensions and open at opposite ends; guides between which the carrier is moved to close the ends of the blank receiving holder or carrier; means having a normal tendency to advance said carrier to drilling position; and a blank feeding device whose travel terminates at a predetermined distance from the blank receiving holder or cavity, substantially as described, whereby the presentation of blanks of abnormal dimensions will arrest the carrier by the interlocking of the blank with the guides and carrier.

19. In a drilling machine such as described, the combination with drilling apparatus, of a blank carrier movable transversely of the drill, gaging devices, said carrier provided with a receiving cavity or holder in which the blank is carried between the gaging devices with its ends in contact therewith for presentation to the drill, means having a normal tendency to advance said carrier to drilling position, and a blank feeder located beyond the gaging devices and terminating its feeding motion at a predetermined distance from the carrier, to properly locate blanks of normal length within the carrier, substantially as described.

20. In a machine such as described, the combination with drilling devices, blank feeding devices, and an intermediate blank carrier and holder provided with means having a normal tendency to advance said carrier to drilling position, of means for accurately positioning the carrier while receiving and discharging blanks, the same including an actuating cam, and a holding latch for the carrier.

21. In a machine such as described, the combination of the following elements, to wit; a blank feeding device including a pusher having a measured feed movement and an interrupted blank supporting channel; a drilling mechanism; a blank carrier intermediate the drill and pusher provided with a blank holder which is presented opposite the pusher in the interval in the blank supporting channel; means having a normal tendency to advance the carrier to drilling position; and a burring tool in position to operate upon the blanks in the channel in rear of the carrier.

22. In a machine such as described, the combination of the following elements, to-wit: a reciprocatory carrier provided with a transverse blank receiving cavity or holder, and means having a normal tendency to advance said carrier to drilling position; a blank channel or guide extending transversely of the path of the carrier and interrupted for the passage of the latter; a pusher operating in said channel on one side of the carrier; gaging devices located to one side of the channel in position to engage blanks in the carrier; and detaining means for the blanks located in the channel beyond the carrier.

23. In a drilling machine such as described, the combination of the following elements, to-wit: a pair of oppositely acting alined drills; a carrier intermediate the drills and movable transversely thereof between blank gaging devices; a feeder for delivering blanks to the carrier; opposing burring tools, and a channel into which the blanks are delivered from the carrier, said channel extending between the burring tools to present successive blanks thereto.

24. In a machine such as described, the combination of the following elements, to-wit: a blank feeding device including a pusher; two alined drills acting in opposition; a carrier intermediate the drills and pusher and provided with a blank holder; actuating devices for reciprocating the carrier to present its blank holder opposite the pusher and between the drills alternately; and a pair of burring tools in position to act upon the blanks after they are discharged from the carrier.

25. In an automatic drilling machine such as described, the combination of the following elements, to-wit: a longitudinally movable drill; a carrier movable transversely of the drill and provided with a blank holder: a matrix channel extending on opposite sides of the carrier in a line intersecting the path of the latter; a feed galley delivering into the matrix channel; and a pusher movable longitudinally of the matrix channel and forming a gate for the feed galley.

FRANK HINMAN PIERPONT.

Witnesses:
HARRY B. BRIDGE,
HERBERT BURRAGE.